United States Patent [19]
Nishihara

[11] Patent Number: 5,764,319
[45] Date of Patent: Jun. 9, 1998

[54] TRANSMISSIVE DISPLAY DEVICE WITH MICROLENSES AND MICROPRISMS ADJACENT COUNTER ELECTRODE

[75] Inventor: Shizuo Nishihara, Kanagawa, Japan

[73] Assignee: Sony Corporation, Tokyo, Japan

[21] Appl. No.: 691,528

[22] Filed: Aug. 2, 1996

[30] Foreign Application Priority Data

Aug. 8, 1995 [JP] Japan ................... 7-224704

[51] Int. Cl.$^6$ ................................ G02F 1/1335
[52] U.S. Cl. ................... 349/8; 349/5; 349/57; 349/95
[58] Field of Search ................ 349/8, 5, 57, 95

[56] References Cited

U.S. PATENT DOCUMENTS

| | | | |
|---|---|---|---|
| 4,704,004 | 11/1987 | Nosker | 349/67 |
| 4,735,495 | 4/1988 | Henkes | 349/62 |
| 4,798,448 | 1/1989 | van Raalte | 349/95 |
| 4,904,061 | 2/1990 | Aruga | 349/8 |
| 5,161,042 | 11/1992 | Hamada | 349/95 |
| 5,355,187 | 10/1994 | Ogino et al. | 349/57 |
| 5,546,202 | 8/1996 | Ansley | 349/62 |
| 5,546,206 | 8/1996 | Nakanishi et al. | 349/5 |
| 5,566,007 | 10/1996 | Ikeda et al. | 349/114 |
| 5,633,737 | 5/1997 | Tanaka et al. | 349/5 |

FOREIGN PATENT DOCUMENTS

| | | |
|---|---|---|
| 0 465 171 | 1/1992 | European Pat. Off. . |
| 2 152724 | 8/1985 | United Kingdom . |

*Primary Examiner*—Anita Pellman Gross
*Attorney, Agent, or Firm*—Hill & Simpson

[57] ABSTRACT

The invention provides a small-sized high-resolution transmissive display device which can be employed in a projector of the color-filterless type. The transmissive display device includes a pair of transparent substrates connected to each other via a predetermined space. The transparent substrates are provided with electrodes forming pixels arranged in a matrix form. The above-described space is filled with an electrooptical material so that the transmissivity of an incident light ray is modulated by the electrooptical material for each pixel and thus converted into an emerging light ray. The transparent substrate on the incident side is further provided with micro lenses and micro prisms. The incident light ray includes three primary color components which have been separated so that they enters the transparent substrate at angles different from each other. The micro lenses focus these three primary color components onto each set of three pixels so that the respective color components correctly fall onto corresponding pixels. The micro prisms are located between the corresponding micro lenses and the sets of three pixels. The micro prisms convert the light ray diverging apart from the optical axis of the micro lenses into a substantially parallel light ray.

15 Claims, 7 Drawing Sheets

TRANSMISSIVE DISPLAY DEVICE WITH MICROLENSES AND MICROPRISMS ADJACENT COUNTER ELECTRODE

BACKGROUND OF THE INVENTION

1. Field of the Invention

The present invention relates to a transmissive display device for use in a projector or the like. More particularly, the present invention relates to an improvement in utilization of light emitted by a light source, which is realized by using micro lenses and micro prisms.

2. Description of the Related Arts

In a typical construction of a projector, an optical source, a color liquid crystal panel, a projection lens, and a screen are disposed in the above-described order along the optical axis. The color liquid crystal panel is for example of the active matrix type, provided with color filters of three primary colors, red (R), green (G), and blue (B), which are disposed at locations corresponding to the respective pixels, wherein the color filters are formed as an integral part of the color liquid crystal panel. White light is emitted by the light source and is passed through the color liquid crystal panel. The light emerging from the color liquid crystal panel is projected onto the screen via the projection lens so that an enlarged color image is formed on the screen. In the projector, however, the color filters disposed on the liquid crystal panel absorb part of the light passing through the color filters. The absorption of light results in a reduction in the brightness of the image formed on a screen.

One known technique to avoid the above problem is to employ a monochrome liquid crystal panel through which a color image is projected. This type of projector is disclosed for example in Japanese Unexamined Patent Publication No. 4-60538 (1992). This type of projector is called a "color-filterless projector" because the monochrome liquid crystal panel has no color filters. FIG. 11 schematically illustrates a color-filterless projector. The projector includes a light source 101, three dichroic mirrors 102-104 inclined at angles different from each other, a monochrome liquid crystal panel 105, a projection lens 106, and a screen 107 wherein these elements are disposed in the above-described order along the optical axis. The light source 101 includes a white lamp and a reflection mirror. The dichroic mirror 102 separates a blue (B) component from the white light emitted by the lamp. The separated B component travels to the monochrome liquid crystal panel 105 and enters it at a predetermined incident angle. A red (R) component is then selectively separated by the dichroic mirror 103 located next to the dichroic mirror 102, and the resultant R-component enters the monochrome liquid crystal panel 105 at a predetermined incident angle. Similarly, a green (G) component is selectively separated by the dichroic mirror 104, and enters the monochrome liquid crystal panel 105 at a predetermined incident angle. The above-described incident angles of the three primary RGB colors are set to different values from each other. Micro lenses are disposed on the monochrome liquid crystal panel 105 such that each set of three pixels of three primary RGB colors has one micro lens. The RGB components enter the micro lens at predetermined different incident angles, and they are focused via the micro lens onto the corresponding pixels. After passing through the corresponding pixels, the RGB components are combined via the projection lens 106 and projected onto the screen 107 so that an enlarged color image is formed thereon.

The color-filterless projector described above is characterized in that three primary RGB color components are incident on micro lenses at predetermined incident angles which are different among RGB components so that the RGB color components are focused via the micro lens onto pixels corresponding to the RGB color components. In this technique, if it is desired to achieve high resolution, it is required that each micro lens should precisely focus each of three primary colors onto a correct pixel. However micro lenses have various aberrations and it is impossible to achieve perfect focus onto correct pixels without slight mixing between three primary colors. To improve the color resolution in practical projectors, therefore, it is required to increase the size of pixels. As a result, the size of the monochrome liquid crystal panel becomes as great as 3 or greater inches. The increase in the size of the liquid crystal panel results in increases in the diameter of the projection lens and the sizes of the dichroic mirrors. Thus, the overall size of the projector becomes great and therefore high cost is required.

If a small-sized high-resolution liquid crystal panel is employed, micro lenses should have a very small focal length so that light is highly concentrated on each pixel of the liquid crystal panel and thus so that a sufficient amount of light passes through the pixels. However, the shorter the focal length of micro lenses, the greater the emerging angle of the light emerging from the panel. Therefore, the projection lens has to have a larger diameter to project the whole light ray emerging from the panel. This means that even if the size of the liquid crystal panel itself can be reduced, the overall size of the projector becomes great.

SUMMARY OF THE INVENTION

In view of the above problems of conventional projectors, it is an object of the present invention to provide a small-sized high-resolution transmissive display device which can be used to realize a small-sized high-resolution projector of the color-filterless type.

To the above end, according to one aspect of the present invention, there is provided a transmissive display device comprising: a first substrate having a plurality of pixel electrodes arranged in a matrix form; a second substrate opposed to the first substrate and having a counter electrode to thereby define pixels between the respective pixel electrodes and the counter electrode, the second substrate including micro lenses and micro prisms disposed between the micro lenses and three pixels, the micro lenses, micro prisms, and three pixels being disposed so that they correspond to each other, the micro lenses focusing an incident light ray, which includes three primary color components separated from each other so that they enter the micro lenses at predetermined angles, onto each set of three pixels so that the respective three color components correctly fall onto corresponding three pixels, the micro prisms converting the incident light ray diverging apart from the optical axis of the micro lenses into a substantially parallel light ray; and an electrooptical material disposed between the first and second substrates, the electrooptical material modulating the transmissivity of the incident light ray for each pixel thereby converting the incident light ray into an emerging light ray.

Preferably each micro prism is a trapezoidal prism including: a flat plane for passing a first incident light ray travelling in a direction parallel to the optical axis without refracting the first incident light ray; a first inclined plane for refracting a second incident light ray travelling in a first oblique direction into a direction parallel to the optical axis; and a second inclined plane for refracting a third incident light ray travelling in a second oblique direction different from the first oblique direction into a direction parallel to the optical axis. The micro lenses and the micro prisms may be formed in an integral fashion. Preferably, the second substrate comprises an upper glass substrate material on which lens surfaces of the micro lenses are formed, and a lower glass substrate material on which prism planes of the micro prisms are formed, wherein the upper glass substrate material and the lower glass substrate material are connected to each other via an adhesive layer. The electrooptical material is preferably a liquid crystal. The pixel preferably comprises an opening and a light blocking area surrounding the opening, wherein the light blocking area is covered with a black matrix. Preferably the black matrix is formed on the first substrate.

According to another aspect of the present invention, there is provided a projector comprising: a light source; a transmissive display panel comprising: a first substrate having a plurality of pixel electrodes arranged in a matrix form; a second substrate opposed to the first substrate and having a counter electrode to thereby define pixels between the respective pixel electrodes and the counter electrode, the second substrate including micro lenses and micro prisms disposed between the micro lenses and three pixels, the micro lenses, micro prisms, and three pixels being disposed so that they correspond to each other, the micro lenses focusing an incident light ray, which includes three primary color components separated from each other so that they enter the micro lenses at predetermined angles, onto each set of three pixels so that the respective three color components correctly fall onto corresponding three pixels, the micro prisms converting the incident light ray diverging apart from the optical axis of the micro lenses into a substantially parallel light ray; and an electrooptical material disposed between said first and second substrates, the electrooptical material modulating the transmissivity of the incident light ray for each pixel thereby converting the incident light ray into an emerging light ray; and a projection lens for projecting the light ray which has passed through the above-described transmissive display panel onto a screen so that an enlarged image is formed on the screen.

DESCRIPTION OF THE PREFERRED EMBODIMENTS

Figure 1:
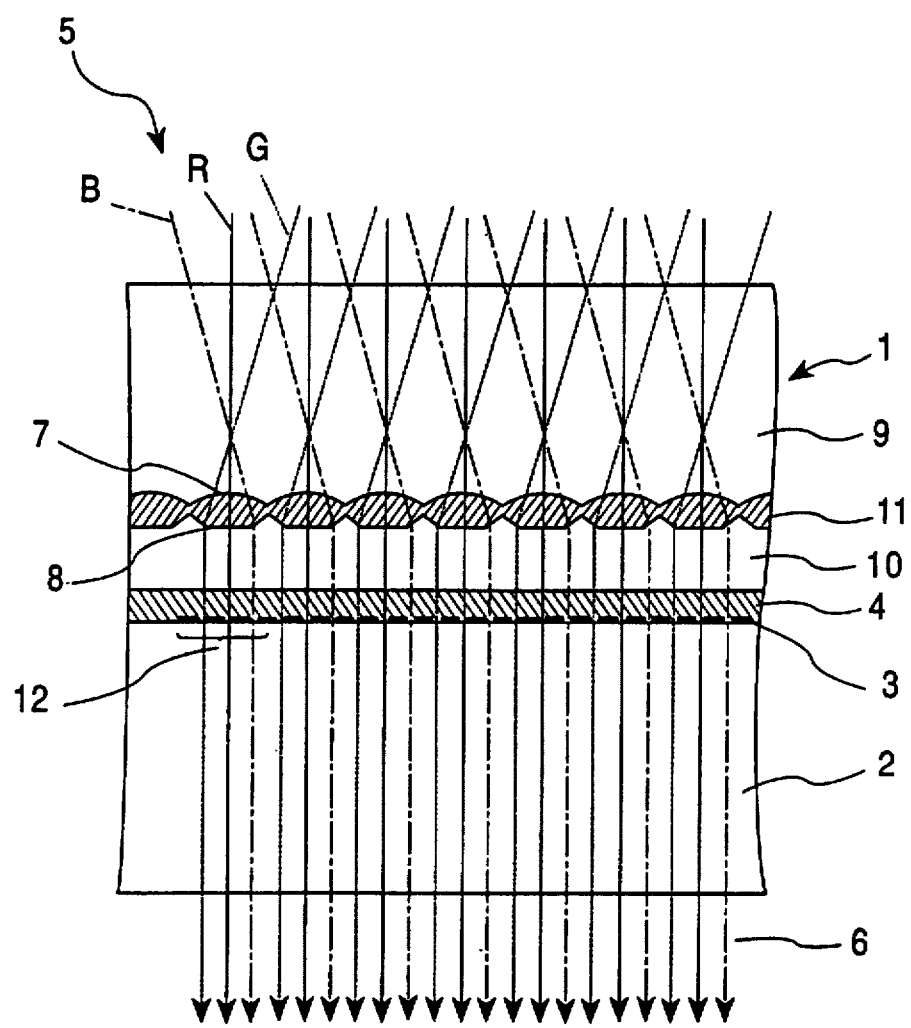
FIG. 1 is a cross-sectional view schematically illustrating a basic structure of a transmissive display device according to the present invention.

Referring to the accompanying drawings, embodiments in best modes will be described below. FIG. 1 is a cross-sectional view illustrating a basic structure of a transmissive display device according to the present invention. As shown in FIG. 1, the transmissive display device includes a pair of transparent substrates 1 and 2 which are connected to each other via a predetermined space. Each transparent substrate 1, 2 has a transparent electrode having a predetermined pattern disposed on its inner surface wherein the electrodes are superimposed on each other so that pixels in a matrix fashion are formed. In this specific example, these pixels are isolated from each other by the black matrix pattern 3. The space between the transparent substrates 1 and 2 is filled with an electrooptical material 4 such as a liquid crystal by which the transmissivity of an incident light ray 5 is modulated for each pixel and the resultant light ray appears as an emerging light ray 6. Micro lenses 7 and micro prisms 8 are formed in an integral fashion on the transparent substrate 1 on the incident side. More specifically, the transparent substrate 1 has a multilayer structure in which an upper glass substrate material 9, on which lens surfaces of micro lenses 7 are formed, is bonded via an adhesive layer 11 to a lower glass substrate material 10 on which prism planes of micro prisms 8 are formed. The micro lenses 7 and the micro prisms 8 are formed along the adhesive layer 11. Incident light rays of three primary colors (R-component, G-component, B-component) which have been separated from white light and enter each micro lens 7 at angles different from each other are focused via the micro lens 7 onto a set of three pixels 12 so that the respective color components correctly fall on corresponding pixels. The micro prisms 8 disposed between the respective micro lenses 7 and the sets of three pixels 12 convert the light rays diverging apart from the optical axis of the micro lenses 7 into light rays substantially parallel to the optical axis. More specifically, the micro prisms are formed in a trapezoidal shape so that each micro prism includes: a flat plane for passing a first incident light ray (R-component) travelling in a direction parallel to the optical axis without refracting the first incident light ray; an inclined plane for refracting a second incident light ray (B-component) travelling in an oblique direction into a direction parallel to the optical axis; and another inclined plane for refracting a third incident light ray (G-component) travelling in another oblique direction into a direction parallel to the optical axis.

Thus, the present invention can provide a transmissive display device for use in a color-filterless single panel projector, which can form a bright image on a screen even when the display device is formed in a small-sized and high-resolution fashion. One specific feature of the present invention is in that refracting planes are disposed under the micro lenses 7. In this invention, the refracting planes are referred to as micro prisms 8. The micro prisms 8 bend the principal ray axis of only G- and B-components which emerge from the micro lenses 7 in oblique directions relative to the normal of pixels and do not bend the principal ray axis of the R-component which emerges from the micro lenses 7 in a direction perpendicular to the pixels. Thus, the micro prisms 8 prevent the incident light rays from diverging after passing through the respective pixels. Thus, it becomes possible to obtain an image with high brightness without having to increase the diameter of the projection lens.

Figure 2:
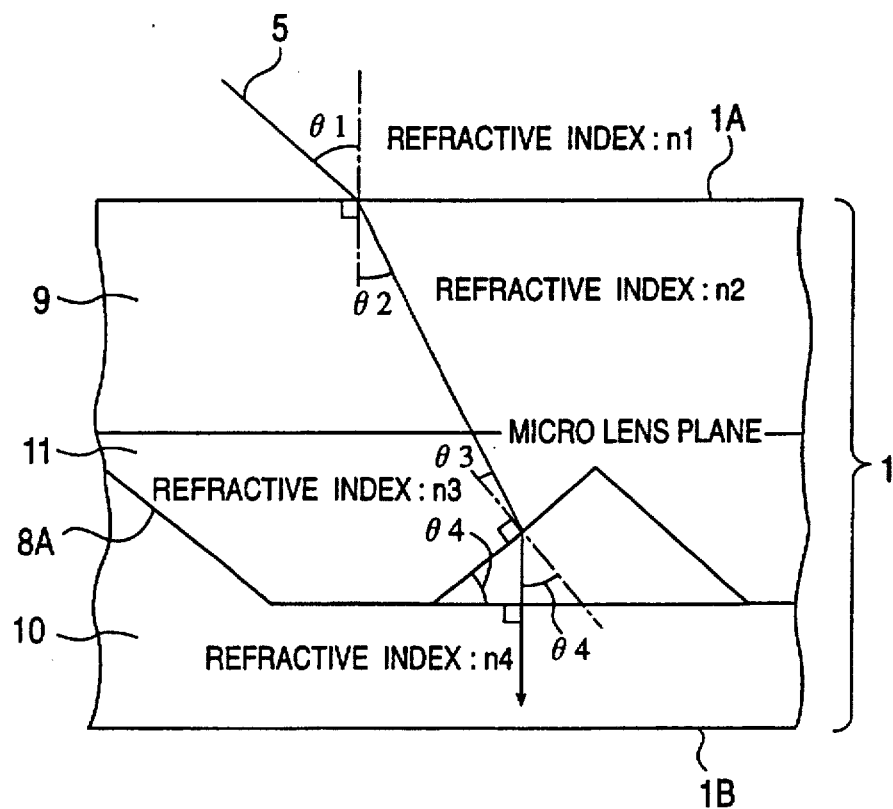
FIG. 2 is a cross-sectional view illustrating an example of the structure of a micro prism.

The shape of the micro prism will be discussed below. FIG. 2 is a schematic diagram, in a simplified and enlarged form, of a micro prism. As described above, the transparent substrate 1 on the incident side has a multilayer structure consisting of an upper glass substrate material 9 with refractive index n2, and a lower glass substrate material 10 with refractive index n4 wherein the upper and lower glass substrate materials are bonded to each other via an adhesive layer 11 with refractive index n3. For an easier understanding, the surface of the micro lens is shown in a simplified fashion in FIG. 2. In this example, the refractive indices are set such that n3>n4. If an oblique incident light ray 5 enters the transparent substrate 1 at an incident angle θ1 with respect to the normal of the incident plane 1A, the incident light ray 5 is refracted into an angle θ2 with respect to the normal of the incident plane 1A at the interface (incident plane 1A) between the medium with refractive index n1 (air) and the medium with refractive index n2. The light ray is then incident on the plane 8A of the micro prism at an angle θ3 and refracted into an angle θ4. The above-described refractive indices and angles of refraction satisfy the following equations (1) and (2) according to Snell's law.

$$n1 \cdot \sin \theta1 = n2 \cdot \sin \theta2 \quad (1)$$

$$n3 \cdot \sin \theta3 = n4 \cdot \sin \theta4 \quad (2)$$

Furthermore, the following equation (3) should be met in order for the principal ray axis of the incident light ray 5 refracted at the plane 8A of the micro prism to be parallel to the optical axis of the micro lens.

$$\theta2 + \theta3 = \theta4 \quad (3)$$

Equation (1) can be rewritten with respect to θ2 into Equation (4) as described below. Equation (2) can be rewritten with respect to θ4 in a similar manner and can further be modified so that θ3 is eliminated using Equation (3), which leads to Equation (5). If θ2 represented by Equation (4) is substituted into Equation (5), then an equation representing the relationship between θ4 and θ1 is obtained. As described above, θ1 refers to the incident angle of the incident light ray 5 and θ1 is set to a designed value (for example 8°). Furthermore, if the refractive indices n1–n4 are given, then θ4 can be determined. As can be seen from FIG. 2, θ4 refers to the final refractive angle of the incident light ray 5 and θ4 determines the inclination of the inclined plane A of the micro prism. In other words, the micro prism is formed in the trapezoidal shape such that the plane A of the micro prism is inclined by an amount indicated by the value of θ4.

$$\theta2 = \sin^{-1}\left( \frac{n1 \cdot \sin\theta1}{n2} \right) \quad (4)$$

$$\theta4 = \tan^{-1}\left( \frac{n3 \cdot \sin\theta2}{n3 \cdot \cos\theta2 - n4} \right) \quad (5)$$

Figure 3:
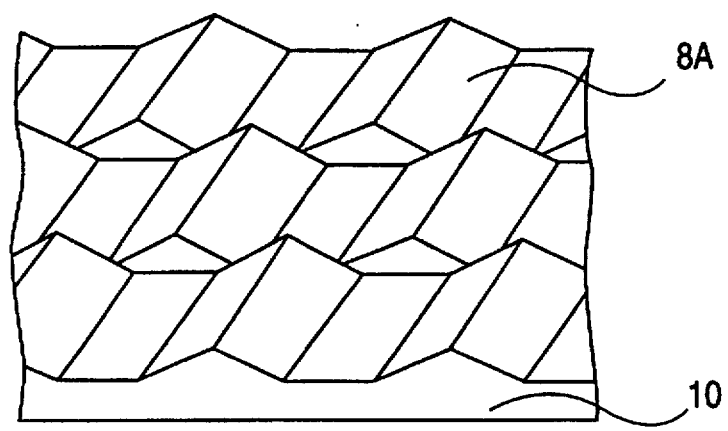
FIG. 3 is a perspective view illustrating the example of the structure of micro prisms.

FIG. 3 is a schematic diagram illustrating the shape of the micro prisms 8A formed on the lower glass substrate material 10. The alternately protruded and recessed shape of the plane 8A of the micro prisms can be formed for example by means of an etching technique. Such the shape of the micro prism plane may also be formed on a transparent resin material by means of injection molding.

Figure 4:
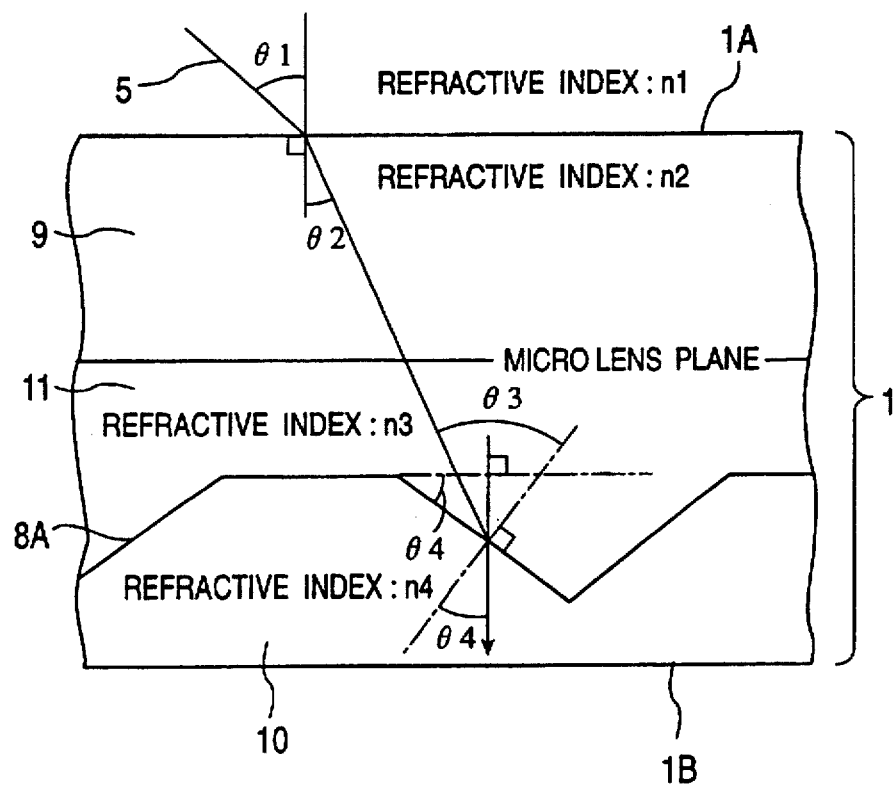
FIG. 4 is a cross-sectional view illustrating another example of the structure of a micro prism.

FIG. 4 illustrates another example of the structure of a micro prism. The structure is essentially the same as that shown in FIG. 2, and similar parts to those in FIG. 2 are denoted by similar reference numbers. However, as opposed to FIG. 2, refractive indices are set such that n3 <n4. According to Snell's law, Equations (6), (7), and (8) should be satisfied as in the case of the previous example in which Equations (1), (2), and (3) should be satisfied.

$$n1 \cdot \sin \theta1 = n2 \cdot \sin \theta2 \quad (6)$$

$$n3 \cdot \sin \theta3 = n4 \cdot \sin \theta4 \quad (7)$$

$$\theta2 + \theta4 = \theta3 \quad (8)$$

From Equations (6), (7), and (8) Equations (9) and (10) shown below are obtained wherein these equations correspond to Equations (4) and (5) in the previous example. Equations (9) and (10) define the relationship between the incident angle θ1 of the incident light ray 5 and the inclination angle θ4 of the micro prism plane 8A, and thus determine the shape of the micro prism plane 8A.

$$\theta2 = \sin^{-1}\left( \frac{n1 \cdot \sin\theta1}{n2} \right) \quad (9)$$

$$\theta4 = \tan^{-1}\left( \frac{n3 \cdot \sin\theta2}{n4 - n3 \cdot \cos\theta2} \right) \quad (10)$$

Figure 5:
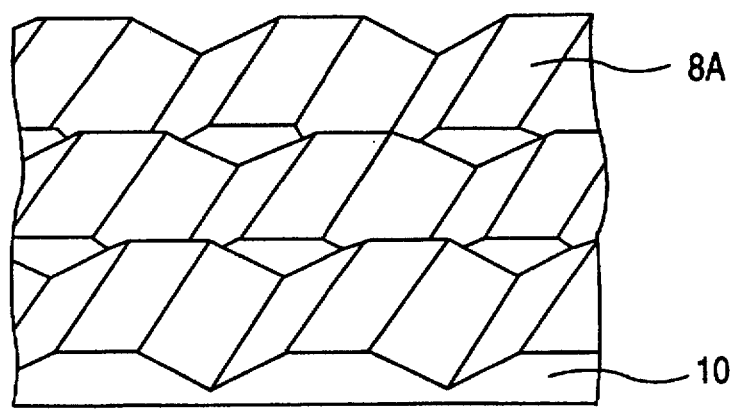
FIG. 5 is a perspective view illustrating the above example of the structure of micro prisms.

FIG. 5 illustrates the shape of micro prism planes 8A formed on the surface of the lower glass substrate material 10. The shape shown in FIG. 5 is designed on the basis of the value θ4 described above in connection with FIG. 4. As can be seen from comparison between FIGS. 3 and 5, the shape of the micro prism planes 8A is reversed between the positive and negative shapes depending on which of refractive indices n3 and n4 is greater.

Figure 6:
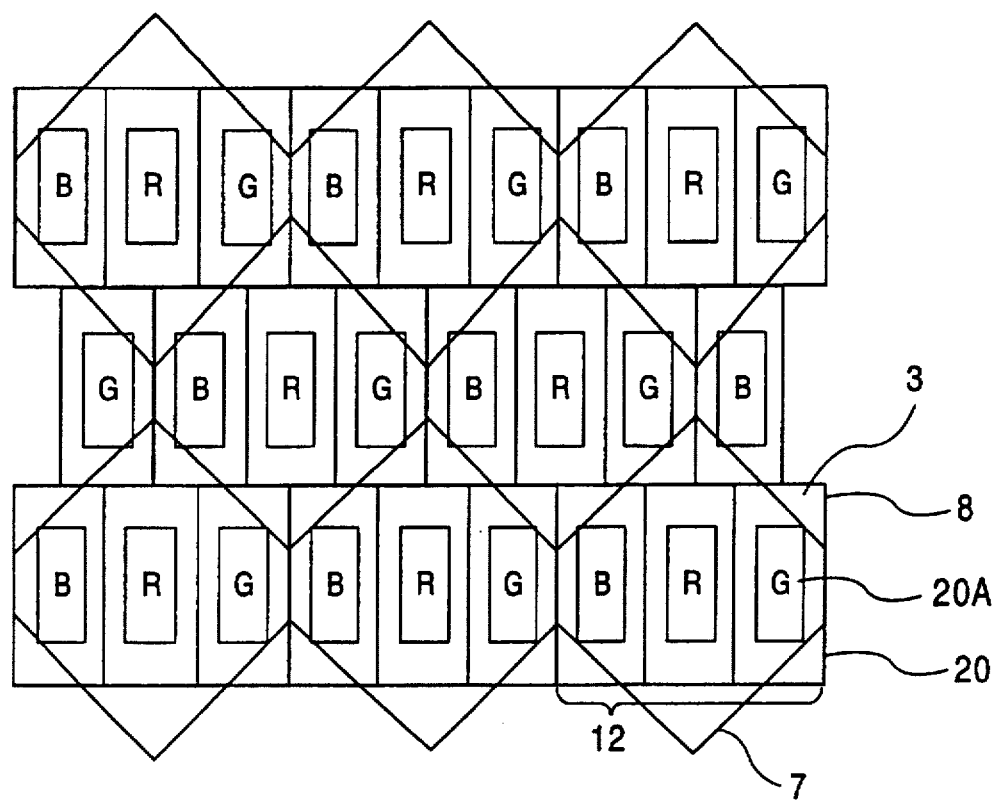
FIG. 6 is a plan view schematically illustrating the relative locations of micro lenses, micro prisms, and pixels.

FIG. 6 is a plan view schematically illustrating the relative locations of micro lenses, micro prisms, and pixels. As shown, pixels 20 are arranged at a fixed intervals so that these pixels 20 periodically correspond to B-, R-, and G-components. Each set 12 of three pixels corresponding to B-, R-, and G-components, respectively, has one micro lens 7 and one micro prism 8. Each pixel 20 includes an opening 20A at a central part and a light blocking area surrounding the opening 20A. The light blocking area is covered with the black matrix pattern 3 shown in FIG. 1. In this specific example, the transmissive display device has an overall size of 1.35 inches along a diagonal line, and the horizontal and vertical pitches of the arrangement of pixels 20 are 18.8 μm and 35 μm, respectively. Furthermore, the openings 20A have a size of 15.3×20 μm².

Figure 7:
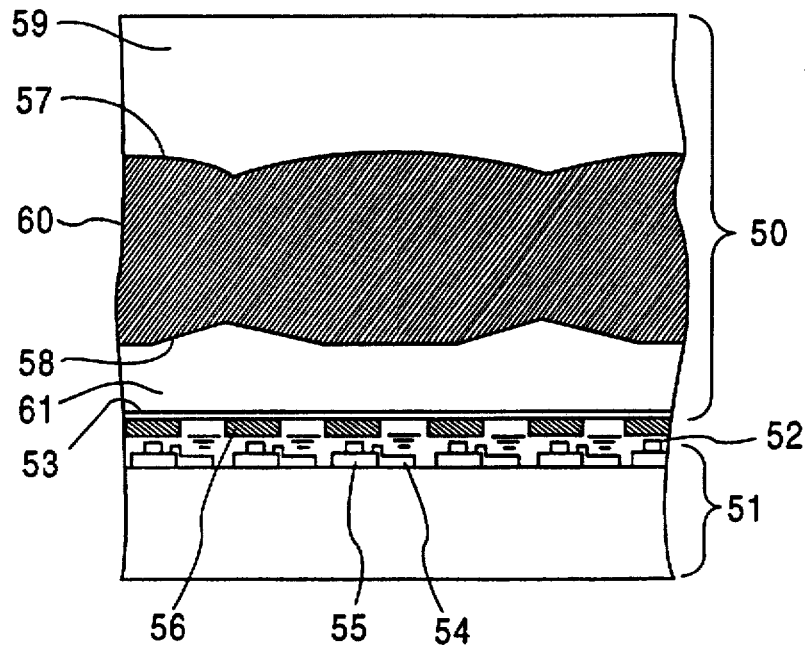
FIG. 7 is a partial cross-sectional view schematically illustrating an embodiment of a transmissive display device according to the present invention.

FIG. 7 is a partial cross-sectional view illustrating a specific structure of the transmissive display device according to the present invention. The transmissive display device is of the active matrix type having a panel structure in which a driving substrate 51 and an opposing substrate 50 are connected to each other via a space filled with a liquid crystal 52 serving as the electrooptical material. Transparent opposing electrodes 53 are formed over the entire area of the inner surface of the opposing substrate 50. Similarly, transparent pixel electrodes 54 are disposed in a matrix form over the inner surface of the driving substrate 51. Film transistors 55 are also formed in an integrated fashion on the inner surface of the driving substrate 51 so that the respective pixel electrodes 54 are driven by these thin film transistors 55. One pixel is formed between each pixel electrode 54 and each opposing electrode 53. Pixels are isolated from each other by the black matrix pattern 56 formed on the opposing substrate 50. The black matrix pattern 56 may also be formed on the driving substrate 51. The opposing substrate 50 has a multilayer structure consisting of an upper transparent substrate material 59 and a lower transparent substrate material which are bonded to each other via a transparent adhesive layer 60. Micro lenses 57 are formed at the interface between the upper transparent substrate material 59 and the intermediate adhesive layer 60, and micro prisms 58 are formed at the interface between the adhesive layer 60 and the lower transparent substrate material 61.

Figure 8:
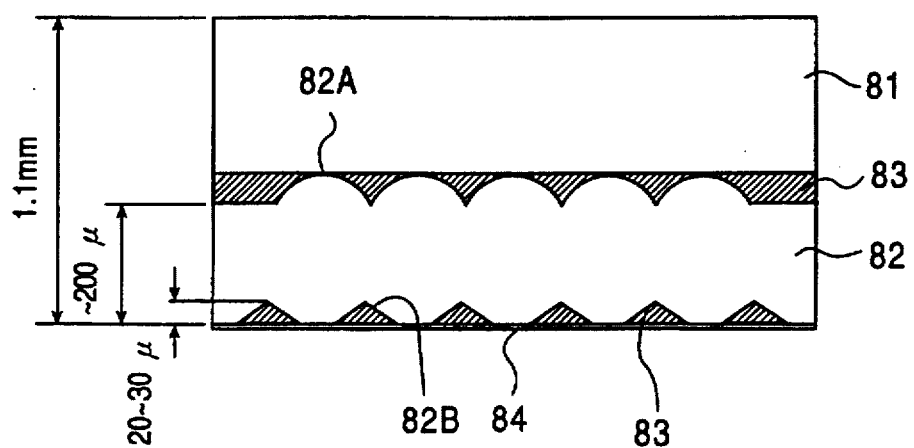
FIG. 8 is a cross-sectional view illustrating an example of the structure of a transparent substrate provided with micro lenses and micro prisms formed in an integral fashion.

Although the transparent substrate employed in the embodiments described above with reference to FIGS. 1 and 7 has the multilayer structure with micro lenses and micro prisms formed as integrated parts of the structure, the transparent substrate having the multilayer structure may also be realized in various different ways. FIG. 8 is a cross-sectional view illustrating an example of such modifications. In this example, the transparent substrate on the incident side includes an upper glass substrate material 81 and a lower glass substrate material 82 which are bonded to each other by an adhesive 83. The glass substrate 82 may be formed for example of neoceram with a refractive index of 1.54. The adhesive 83 is selected so that its refractive index is equal to or less than 1.45. Convex micro lens surfaces 82A are formed on the surface of the glass substrate material 82, while convex micro prism surfaces 82B are formed on the back surface of the glass substrate material 82. The valley portions on the micro prism surfaces 82B are filled with an adhesive 83 so as to obtain a flat surface. Transparent opposing electrodes 84 of ITO or a similar material are deposited over the entire area of the flattened surface described above. The trapezoid of the micro prism surfaces 82B has a height in the range from 20 to 30 µm. The average thickness of the glass substrate material 82 is about 200 µm. The total thickness of the structure including the upper glass substrate material 82 and the upper glass substrate material 81 is about 1.1 mm. Although in this specific example the micro lens surfaces 82A are formed in a convex spherical shape, they may also be formed in different shapes such as an aspheric shape so as to correct aberrations.

Figure 9:
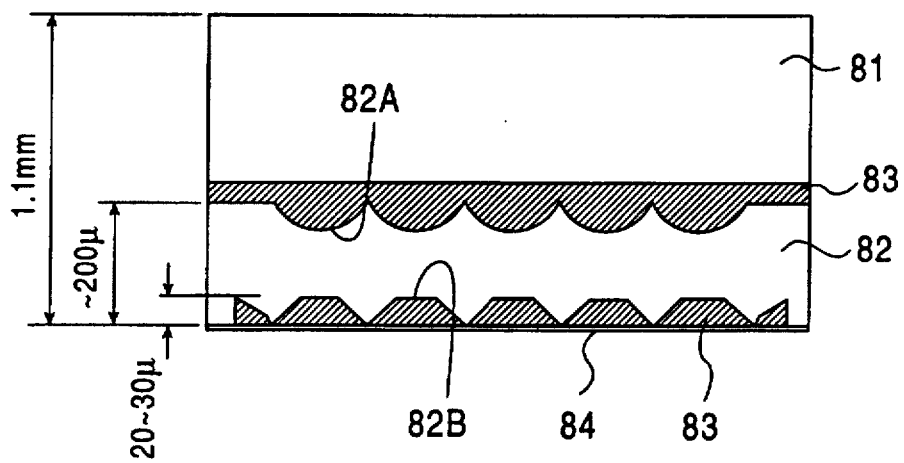
FIG. 9 is a cross-sectional view illustrating another example of the structure of the transparent substrate.

FIG. 9 is a cross-sectional view illustrating another modified embodiment of a transparent substrate on the incident side. Similar parts to those in FIG. 8 are denoted by similar reference numbers. In this example, quartz with a refractive index of 1.46 is employed as a lower glass substrate material 82. On the other hand, a transparent resin having a refractive index of 1.60 or greater is employed as an adhesive 83. Therefore, the refractive index of the adhesive 83 is greater than that of the glass substrate material 82 as opposed to the example shown in FIG. 8. Accordingly, concave micro lens surfaces 82A are formed on the surface of the glass substrate material 82, and concave micro prism surfaces 82B are formed on the back surface of the glass substrate material 82.

Figure 10:
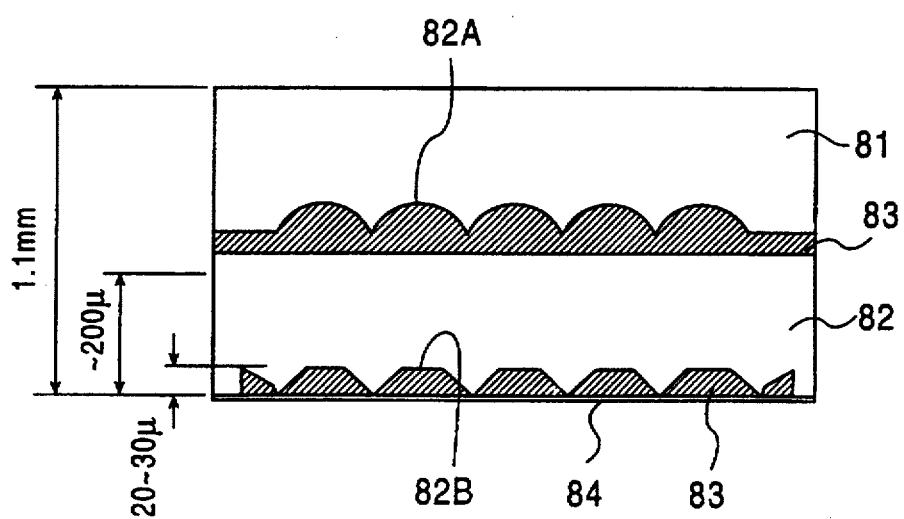
FIG. 10 is a cross-sectional view illustrating still another example of the structure of the transparent substrate.
Figure 11:
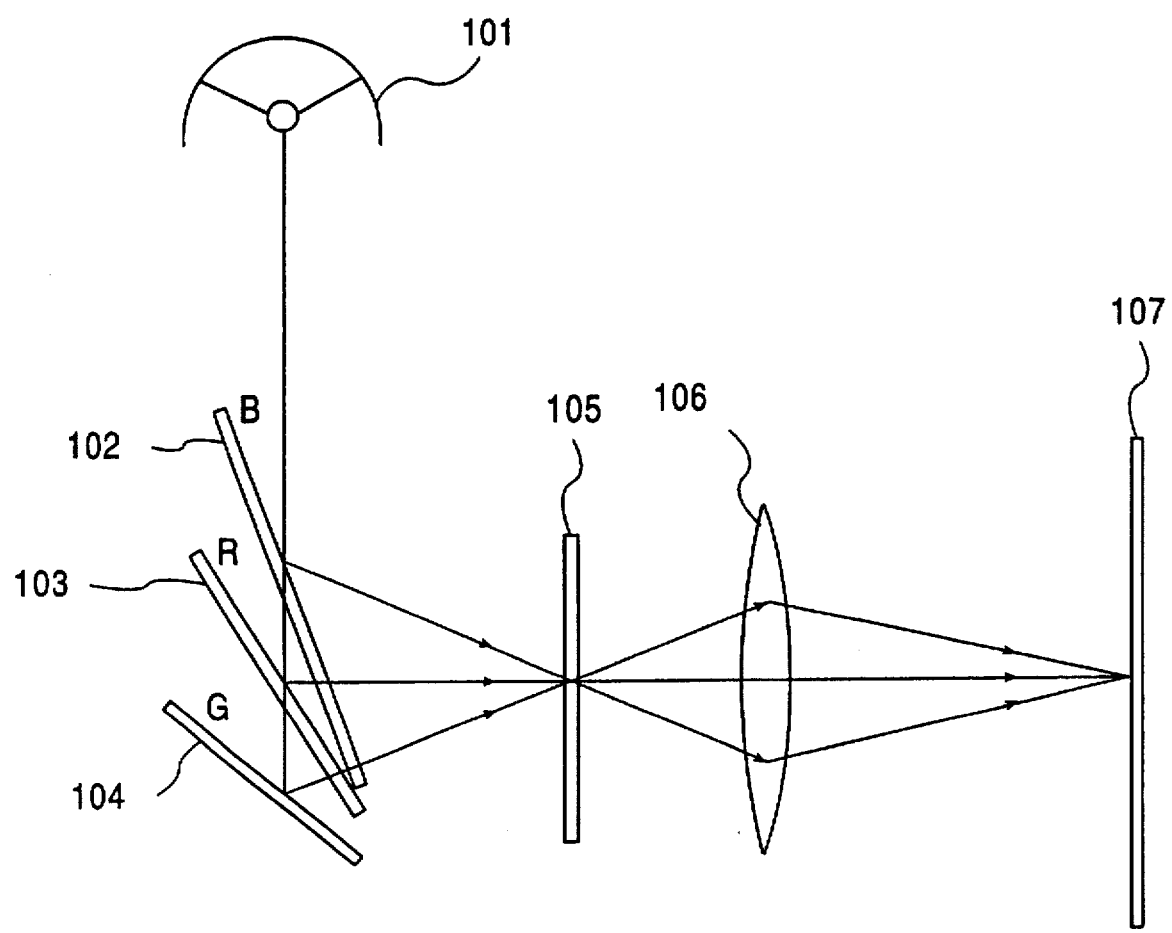
FIG. 11 is a schematic diagram of a projector of the color-filterless type.

FIG. 10 is a cross-sectional view illustrating still another modified embodiment of a transparent substrate on the incident side. Also in this figure, similar parts to those in FIG. 9 are denoted by similar reference numbers. The difference from the embodiment shown in FIG. 9 is that the micro lens surfaces 82A are formed not on the lower glass substrate material 82 but on the back surface of the upper glass substrate material 81. In addition to the examples described above, further various changes and modifications are possible, and thus it should be understood that the structures shown above with reference to FIGS. 8–10 are only illustrative of the invention.

In the present invention, as described above, micro prisms are disposed between micro lenses and pixels so that a high-quality color image is formed on a screen. This makes it possible to employ a small-sized high-resolution transmissive display device in a single panel type projector. By applying the present invention to a color-filterless projector, it is possible to reduce the size of various members such as dichroic mirrors, and thus it is possible to reduce the overall size of the projector. This also allows a reduction in cost.

What is claimed is:

1. A transmissive display device comprising:
   a first substrate having a plurality of pixel electrodes arranged in a matrix form;
   a second substrate opposed to said first substrate and having a counter electrode formed on an inner surface thereof, said second substrate including micro lenses and micro prisms, each of said micro lenses being formed to receive incident light which comprises a plurality of color components separated from each other and for focusing the incident light on a set of pixel electrodes, each of said micro prisms being formed to convert a light ray tilted to the optical axis of the micro lenses by passing through the micro lenses into a substantially parallel light to the optical axis of the micro lenses; and
   an electro-optical material disposed between said first and second substrates, for modulating the transmissivity of the incident light for each pixel defined by each of the pixel electrodes and the counter electrode.

2. A transmissive display device according to claim 1, wherein each said micro prism is a trapezoidal prism including:
   a flat plane for passing a first incident light ray traveling in a direction parallel to said optical axis without refracting said first incident light ray;
   a first inclined plane for refracting a second incident light ray traveling in a first oblique direction into a direction parallel to said optical axis; and
   a second inclined plane for refracting a third incident light ray traveling in a second oblique direction different from said first oblique direction into a direction parallel to said optical axis.

3. A transmissive display device according to claim 1, wherein said micro lenses and said micro prisms are formed in an integral fashion.

4. A transmissive display device according to claim 3, wherein said second substrate comprises an upper glass substrate material on which lens surfaces of said micro lenses are formed, and a lower glass substrate material on which prism planes of said micro prisms are formed, said upper glass substrate material and said lower glass substrate material being connected to each other via an adhesive layer.

5. A projection type display device according to claim 1, wherein said electrooptical material is a liquid crystal.

6. A transmissive display device according to claim 1, wherein said pixel comprises an opening and a light blocking area surrounding said opening, said light blocking area being covered with a black matrix.

7. A transmissive display device according to claim 6, wherein said black matrix is formed on said first substrate.

8. A transmissive display device according to claim 1, wherein said plurality of color components comprises three primary colors, and said set of pixel electrodes comprises three pixels each of which corresponds to one of the three primary colors.

9. A projector comprising:
   a light source;
   a transmissive display panel comprising:
      a first substrate having a plurality of pixel electrodes arranged in a matrix form;
      a second substrate opposed to said first substrate and having a counter electrode formed on an inner surface thereof, said second substrate including micro lenses and micro prisms, said micro lenses being formed to receive, incident light, which comprises a plurality of color components separate from each other and for focusing the incident light on a set of pixel electrodes, each of said micro prisms converting the incident light ray diverging apart from the optical axis of said micro lenses into a substantially parallel light ray; and an electro-optical material disposed between said first and second substrates, for modulating the transmissivity of the incident light for each pixel defined by each of the pixel electrodes and the counter electrode; and a projection lens for projecting the light ray which has passed through said transmissive display panel onto a screen so that an enlarged image is formed on the screen.

10. A projector according to claim 9, wherein each said micro prism is a trapezoidal prism including:

a flat plane for passing a first incident light ray traveling in a direction parallel to said optical axis without refracting said first incident light ray;

a first inclined plane for refracting a second incident light ray traveling in a first oblique direction into a direction parallel to said optical axis; and a second inclined plane for refracting a third incident light ray traveling in a second oblique direction different from said first oblique direction into a direction parallel to said optical axis.

11. A projector according to claim 9, wherein said micro lenses and said micro prisms are formed in an integral fashion.

12. A projector according to claim 11, wherein said second substrate comprises an upper glass substrate material on which lens surfaces of said micro lenses are formed, and a lower glass substrate material on which prism planes of said micro prisms are formed, said upper glass substrate material and said lower glass substrate material being connected to each other via an adhesive layer.

13. A projector according to claim 9, wherein said pixel comprises an opening and a light blocking area surrounding said opening, said light blocking area is covered with a black matrix.

14. A projector according to claim 13, wherein said black matrix is formed on said first substrate.

15. A transmissive display device according to claim 9, wherein said plurality of color components comprises three primary colors, and said set of pixel electrodes comprises three pixels each of which corresponds to one of the three primary colors.

* * * * *